Sept. 5, 1967 H. EHRENS ETAL 3,339,868

REFRIGERATOR MOTOR-COMPRESSOR MOUNTING MEANS

Filed May 13, 1965 4 Sheets-Sheet 1

INVENTORS
Henry Ehrens
Sidney Weiner

1

REFRIGERATOR MOTOR-COMPRESSOR MOUNTING MEANS

Filed May 13, 1965 4 Sheets-Sheet 2

REFRIGERATOR MOTOR-COMPRESSOR MOUNTING MEANS

Filed May 13, 1965

4 Sheets-Sheet 3

REFRIGERATOR MOTOR-COMPRESSOR MOUNTING MEANS

Filed May 13, 1965

4 Sheets-Sheet 4

3,339,868

REFRIGERATOR MOTOR-COMPRESSOR MOUNTING MEANS

Henry Ehrens, Riverdale, N.Y., and Sidney Weiner, Cresskill, N.J., assignors to Sealed Unit Parts Co., Inc., New York, N.Y., a corporation of New York Filed May 13, 1965, Ser. No. 455,449
8 Claims. (Cl. 248—14)

ABSTRACT OF THE DISCLOSURE

A refrigerator has a machinery compartment opening onto its rear wall for accepting a motor-compressor unit. The motor-compressor unit is mounted within the compartment by a two-part mounting means. The first part includes support brackets connected to the motor-compressor unit. The second part includes either mounting straps or L-shaped brackets (connected to the support brackets) which span the machinery compartment opening and are connected to the rear wall.

This invention relates generally to refrigerator motor-compressor mounting means and more particularly to mounting devices for supporting a universal type motor-compressor unit within a refrigeration compartment.

Since 1946, refrigerators that have been sold for commercial and domestic use have been designed for maximum food storage space. This has been accomplished by using thinner and more efficient insulation and reducing the machinery compartment to its minimum limits. This has also been the incentive to design the motor-compressor (which is commonly referred to as the "dome") to its smallest configuration.

The allocation of machinery space is usually made after the design engineer has laid out the necessary condenser area and incorporated the dome in a way to reduce the overall space. As a result, if the dome should become defective, it is almost impossible to replace the original dome with a universal type replacement because it couldn't fit into the original space. The difficulty not only lies in the fact that the original dome had specific mounting brackets but the overall shape is different.

To circumvent this problem the serviceman would adapt special brackets and invariably the dome would extend beyond the rear panel of the refrigerator. One fact that complicates the problem is that all "home made brackets" would be designed to support or suspend the replacement dome within its true center of gravity; i.e., in the same manner that the original dome was supported or suspended.

Although the universal replacement domes are generally smaller than most originals, the main problem becomes one of suspension or support in a space other than where the original dome was located.

It is an object of the present invention to provide mounting means for mounting universal domes within a refrigerator which eliminate the need to position the dome with the center of gravity at the approximate center of the mounting means.

It is another object of the present invention to provide mounting means for a universal dome which will provide adequate support for the dome and counterbalance the torque caused by eccentric mounting of the dome.

It is a further object of the present invention to provide mounting means for a universal dome for mounting the dome upright and flush with the rear wall of a refrigerator thereby eliminating the possibility of interference between the dome and the other elements in the refrigerator.

Accordingly, a preferred embodiment of the present invention comprises a cylindrical dome having a rectangular base at the bottom thereof which is provided with a plurality of apertures therethrough. A pair of longitudinally spaced support brackets are connected to the dome and project laterally beyond the periphery of the outer surface of the dome. The brackets are provided with threaded holes adjacent their free ends. A plurality of mounting plates or straps are provided and include rows of holes therethrough; each of said row of holes being adapted to be aligned with the holes in said support bracket so a bolt may connect a strap and a bracket by extending through the aligned holes. Conventionally the machinery compartment of a refrigerator is open at the rear thereof and the dome is positioned within this opening at the rear of the refrigerator. The mounting straps are sized and positioned to extend beyond the opening and overlie the rear wall of the refrigerator. Moreover, the mounting straps are provided with additional holes adjacent their free ends so bolts passing therethrough and through appropriately drilled holes in the rear wall of the refrigerator will connect the strap to the rear wall of the refrigerator thereby rigidly mounting the dome within the machinery compartment of the refrigerator in an upright position. Thus, the rear surface of the dome will be substantially coplanar with the rear wall of the refrigerator and the refrigerator can be mounted flush against the wall. Accordingly, the support brackets and the mounting straps provide a rigid mounting for the dome which maintains the dome in place in upright position and counterbalances the torque developed due to the fact the center of gravity of the dome is spaced from the mounting straps.

Other embodiments include various combinations of differently shaped straps and supporting brackets and shelves which rigidly mount the dome on the rear wall of the refrigerator and provide adequate support for the dome albeit the center of gravity of the dome is spaced from the connecting brackets.

It is a feature of the present invention to provide mounting means for a universal dome which is efficient in operation and economical to manufacture.

The above and other objects and advantages of the present invention will become more apparent from a consideration of the following detailed description when taken in conjunction with the drawings in which.

It is to be understood that like numbers in the various figures indicate identical elements.

Figure 1:
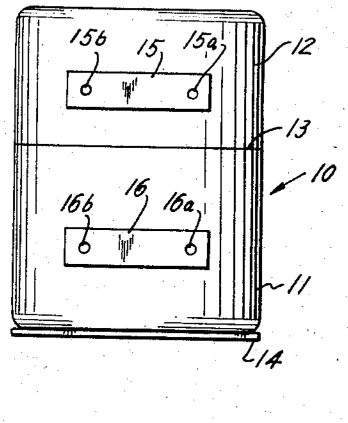
FIG. 1 is a rear elevation view of a universal dome of the present invention.

In accordance with the present invention, a conventional universal type motor-compressor unit for use in a refrigeration system is received within a cylindrical housing to provide a dome 10, as shown in FIG. 1. Dome 10 comprises a cup-shaped lower section 11 having an open top. The open top is adapted to be closed by a cover section 12. Sections 11 and 12 are sealed along junction 13 to protect the motor-compressor unit within dome 10 from dirt, moisture and the like. A substantially square or rectangular base plate 14 is connected to the bottom of dome 10 by any conventional means as, for example, by welding and is provided with a plurality of apertures **14*a*–14*d*; each aperture being positioned adjacent a respective corner. Additionally, dome 10** (including the housing and motor-compressor unit) is constructed so the center of gravity thereof is approximately centrally located. Compressor connections (not shown) are provided to connect the compressor to the refrigeration system when the dome is mounted within a refrigerator. Similarly, electrical connections are provided (not shown) to connect the motor to a source of potential.

In a preferred embodiment, a pair of support brackets are provided on dome or housing 10 and are cooperable with mounting brackets connected to a refrigerator for mounting the dome 10 upright within the machinery compartment of a refrigerator flush with the rear wall thereof. In this position, the dome will not interfere with the elements within the compartment but it is obvious that the center of gravity of the dome will be spaced from the point of connection to the rear wall thereby creating a torque. Thus, in the present invention the support brackets and mounting brackets supply a force which counterbalance the torque due to the eccentric mounting of the dome.

Figure 2:
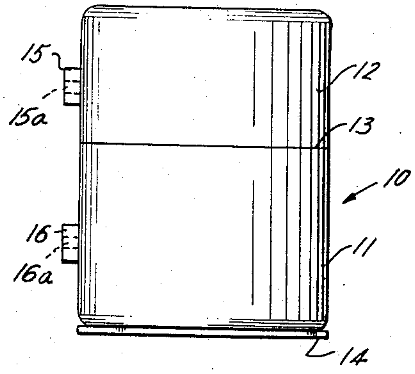
FIG. 2 is a side elevation view of the dome shown in FIG. 1.
Figure 3:
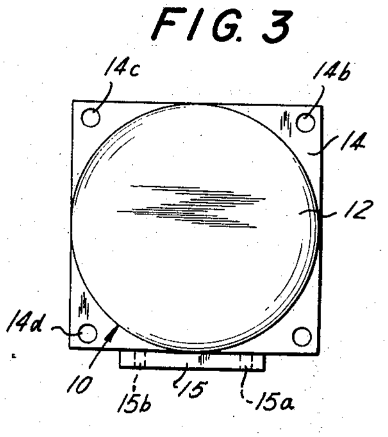
FIG. 3 is a top plan view of the dome shown in FIG. 1.

More particularly, as shown in FIGS. 1, 2 and 3, a support bracket 15 is connected to the rear of upper section 12 intermediate the top of section 12 and junction 13. A similar support bracket 16 is connected to lower section 11 intermediate junction 13 and base 14. Brackets 15 and 16 are substantially rectangular and lie in the same plane. The brackets extend longitudinally and are connected to the outer surface of dome 10 at a point approximately midway between the ends of the brackets, as by welding, so the brackets 15 and 16 will essentially be tangent to the outer surface of dome 10 at their points of attachment thereto. Thus, the free ends of the brackets will be spaced from the periphery of dome 10. As shown in FIG. 1, bracket 15 is provided with respective apertures **15*a* and 15*b* adjacent the free ends of the bracket; bracket 16 is provided with respective apertures 16*a* and 16*b* adjacent the free ends of this bracket. Preferably, apertures 15*a* and 15*b* will respectively overlie apertures 16*a* and 16*b*. Moreover, the apertures 15*a*, 15*b* and 16*a*, 16*b*** may be threaded for the reasons noted below.

Figure 4:
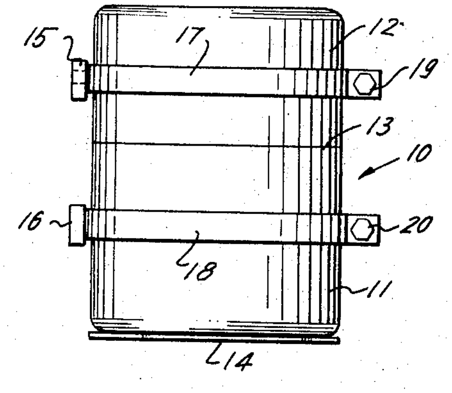
FIG. 4 is a side elevation view of a dome illustrating a second embodiment of support brackets of the present invention.
Figure 5:
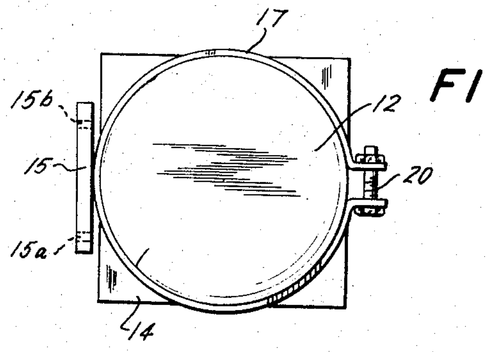
FIG. 5 is a top plan view of the dome assembly shown in FIG. 4.

FIGS. 4 and 5 illustrate another method for connecting the support brackets to dome 10. Thus, brackets 15 and 16 are affixed to the rear of the respective circular clamps 17 and 18. Clamp 17 encircles the upper section 12 of dome 10 and is clamped in place by a bolt 19 which passes through the ends of the clamp and has a nut threaded thereon. Similarly, clamp 18 encircles the bottom section 11 of dome 10 and is clamped in place by a bolt 20 passing through the ends of the clamp and having a nut threaded thereon. The respective clamps 17 and 18 are positioned so the respective support brackets 15 and 16 will again be tangential to respective points on the outer surface of dome 10 so the free ends of the brackets will be spaced from the periphery of the dome.

Although for purposes of the following discussion, it will be assumed that the dome mounted on the refrigerator is the type having support brackets 15 and 16 actually affixed to the outer surface of the dome as by welding, it is to be understood that the dome having the brackets 15 and 16 clamped thereon may be used instead.

Figure 6:
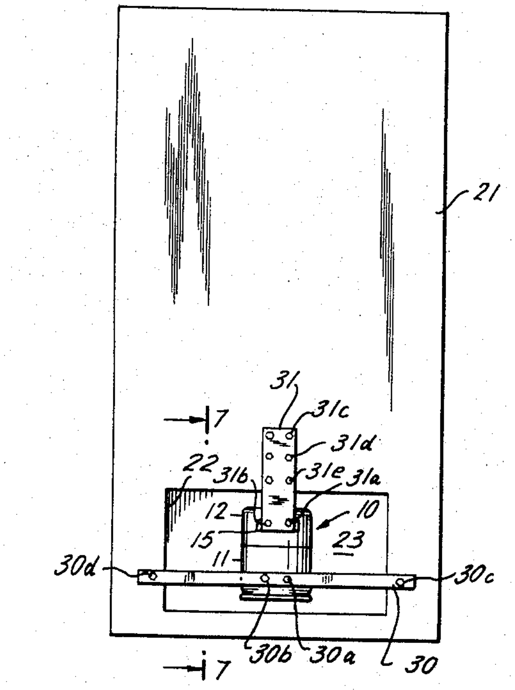
FIG. 6 is a rear elevation view of a dome mounted within a refrigerator machinery compartment by a first arrangement of mounting brackets.
Figure 7:
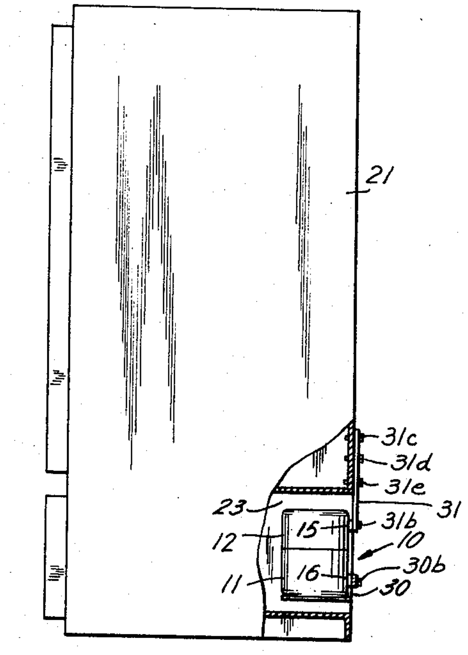
FIG. 7 is a partial sectional view taken along lines 7—7 in FIG. 6.

Support brackets 15 and 16 and base 14 are adapted to be connected, in various combinations as noted below, to a respective mounting bracket which mounts the dome on the rear wall of a refrigerator. Thus, a first embodiment of a mounting bracket is shown in FIGS. 6 and 7. The rear wall 21 of a refrigerator is provided with a rectangular opening 22 which gives access to the machinery compartment 23 of the refrigerator. Dome 10 is received within compartment 23 and a mounting strap or bracket 30, whose width is larger than the width of opening 22 secures the dome to wall 21. More particularly, strap 30 is provided with two longitudinally spaced apertures located equidistantly from the center of the strap and apertures repectively located adjacent the free ends of the strap. The intermediate apertures are positioned to be aligned with apertures **16*a* and 16*b* in bracket 16. Thus, bolts 30*a* and 30*b* passing through the respective intermediate apertures are threadedly received within apertures 16*a* and 16*b* to rigidly connect strap 30 to bracket 16. Similarly, bolts 30*c* and 30*d* passing through apertures 30*a* and 30*b* and appropriately drilled holes in rear wall 21 rigidly mount dome 10 within compartment 23. As seen in FIG. 7, the center of gravity of dome 10 will be spaced from connecting strap 30 thereby giving rise to a counterclockwise torque. To further counterbalance the forces set up by the eccentric mounting of dome 10, a second mounting plate or bracket 31 is provided which includes longitudinally spaced apertures adjacent one end of the plate which are positioned to be aligned with apertures 15*a* and 15*b*, respectively, in bracket 15. Additionally, mounting plate 31 is provided with a plurality of vertically spaced rows of apertures adjacent the other end of plate 31. Bolts 31*a* and 31*b* respectively pass through the lower apertures in plate 31 and are threadedly received within apertures 15*a* and 15*b* of bracket 15 to connect the upper section of dome 10 to plate 31. Similarly, bolts pass through the remaining apertures in plate 31 and appropriate holes which may be drilled in the rear wall 21 of the refrigerator to connect plate 31 to the refrigerator. Thus, strap 30 and plate 31 rigidly mount dome 10 on the rear wall 21 of the refrigerator and provide counterbalancing forces which counteract the torque set up by dome 10 because of the fact that the center of gravity of dome 10 is spaced from the connecting points. That is, strap 30 and plate 31 are located in a plane tangential to the periphery of dome 10** rather than being located at the center of gravity of the dome.

Figure 8:
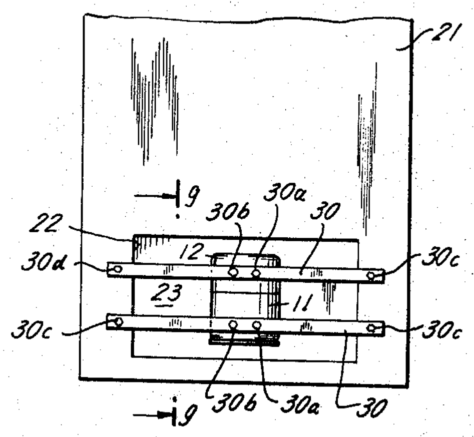
FIG. 8 illustrates a dome mounted within a refrigerator machinery compartment by a second arrangement of mounting straps.
Figure 9:
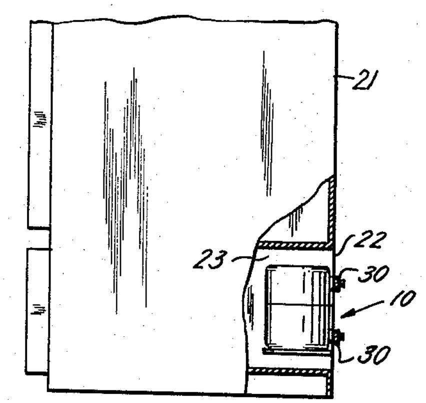
FIG. 9 is a partial sectional view taken along lines 9—9 in FIG. 8.

A second embodiment illustrating the mounting means of the present invention is shown in FIGS. 8 and 9 and comprises two straps 30 which are respectively connected to brackets 16 and 15 in the manner noted above to rigidly connect dome 10 to the rear wall 21 of the refrigerator so dome 10 is flush with the rear wall.

Figure 10:
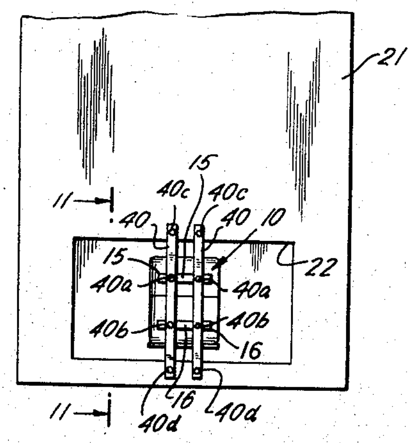
FIG. 10 illustrates a dome mounted within a refrigerator machinery compartment by a third arrangement of mounting brackets.
Figure 11:
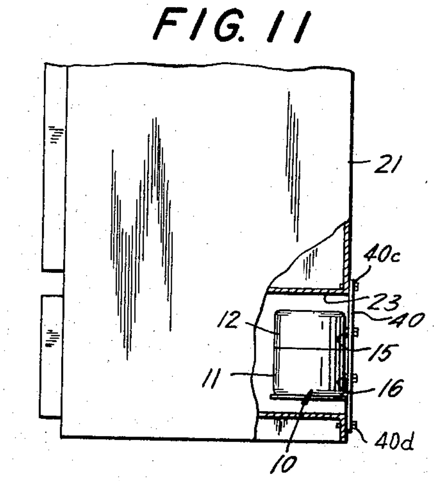
FIG. 11 is a partial sectional view taken along lines 11—11 of FIG. 10.

A third embodiment of means for mounting the universal dome in the machinery compartment of a refrigerator in accordance with the present invention is illustrated in FIGS. 10 and 11 and comprises, in part, longitudinally spaced straps 40 whose height is substantially greater than the height of opening 22 in the rear wall 21 of the refrigerator. Each of the straps 40 is provided with vertically spaced apertures which are spaced from one another by the transverse distance between brackets 15 and 16 so the upper respective apertures will respectively be aligned with apertures 15*a* and 15*b* in bracket 15 and the respective lower apertures in each of the straps 40 will be respectively aligned with apertures 16*a* and 16*b* in bracket 16. Bolts 40*a* are provided for connecting straps 40 to bracket 15 and bolts 40*b* are provided for connecting straps 40 to bracket 16 in the conventional manner. Additionally, each of the straps 40 is provided with apertures respectively located adjacent the free ends of the straps which are adapted to overlie rear wall 21 of the refrigerator. Accordingly, appropriate holes may be drilled in the rear wall of refrigerator 21 in alignment with these apertures so bolts 40*c* and 40*d* may pass through the apertures in straps 40 and the rear wall of refrigerator 21 to rigidly connect the dome 10 to the rear wall of the refrigerator.

Figure 12:
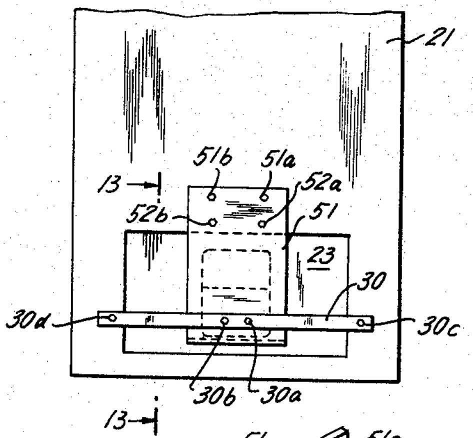
FIG. 12 illustrates a dome mounted on the rear wall of the refrigerator by a fourth arrangement of mounting brackets.
Figure 13:
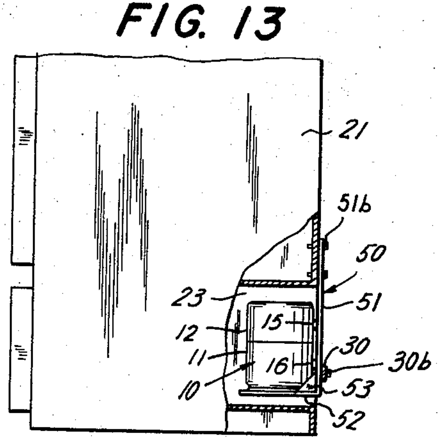
FIG. 13 is a partial sectional view taken along lines 13—13 of FIG. 12.
Figure 14:
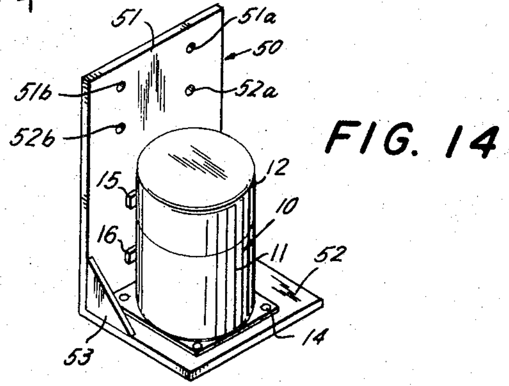
FIG. 14 is a perspective view of the mounting bracket shown in FIG. 12.

A fourth embodiment of the mounting means of the present invention is illustrated in FIGS. 12, 13 and 14 and includes an L-shaped mounting bracket 50 having an upstanding wall 51 and an integral horizontally extending base 52. Additionally, struts 53 may be provided between base 52 and wall 51 to add structural rigidity to the bracket. Wall 51 is provided with a first row of spaced apertures which are respectively spaced from the top edge of the wall. A second row of apertures are respectively spaced below the apertures. Bolts 51*a*–51*d* pass through the aforementioned aperture and connect bracket 51 to wall 21.

Dome 10 is positioned on base 52 of mounting bracket 50 with the axis of dome 10 vertical. Base 52 may be provided with bores therethrough which are in alignment with holes 14*a*–14*d* so bolts passing therethrough will connect base 14 to base 52. Bracket 50 is positioned on the rear wall 21 of the refrigerator with base 52 projecting into compartment 23 of the refrigerator so dome 10 is received within the compartment with the outer rear peripheral wall of dome 10 being substantially flush with rear wall 21 of the refrigerator. To provide added support and rigidity, a strap 30 is also provided. Thus, two longitudinally spaced apertures are provided adjacent the bottom edge of wall 51 and are positioned to be aligned with apertures 16*a* and 16*b* in support bracket 16 when the dome is mounted on base 52 of bracket 50. Accordingly, bolts 30*a* and 30*b* are provided which extend through the apertures in mounting strap 30 and through the apertures in L-shaped bracket 50 and are respectively threadedly received in the respective apertures 16*a* and 16*b*, thereby preventing dome 10 from moving toward the center point of mounting bracket 50 (when the base of dome 10 is not bolted to bracket 50). It is to be understood that appropriate holes are drilled in rear wall 21 to receive bolts 30*c* and 30*d* which pass through the end apertures of strap 30 to provide further rigid support for the dome.

Figure 15:
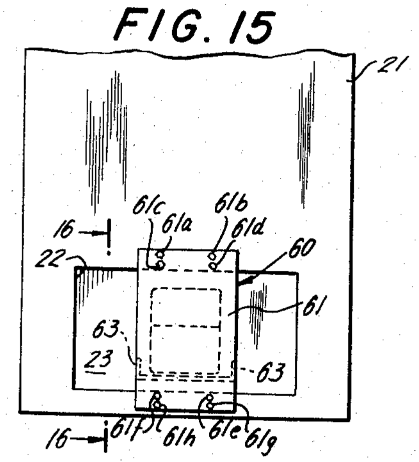
FIG. 15 illustrates a dome mounted on the rear wall of a refrigerator by a fifth embodiment of mounting brackets.
Figure 16:
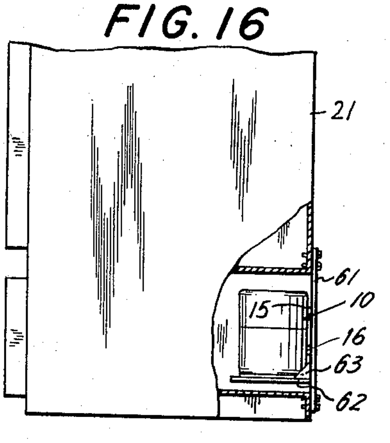
FIG. 16 is a partial sectional view taken along lines 16—16 of FIG. 15.

A fifth embodiment of mounting means for a universal-type refrigerator dome of the present invention is illustrated in FIGS. 15 and 16 and comprises a mounting bracket 60 having a rear vertical wall 61 and a horizontally extending base plate 62 spaced from the bottom edge of wall 61. The height of rear wall 61 is substantially greater than the height of opening 22 in the rear wall 21 of the refrigerator. Support bracket 60 is provided with struts 63 between wall 61 and plate 62 to add structural rigidity to the bracket. Base plate 62 is provided with four apertures (not shown) which are respectively positioned to be aligned with apertures 14*a*–14*b* in base 14 of dome 10 to rigidly connect dome 10 to bracket 60 thereby eliminating the need for a strap 30 to maintain the dome in place. A first pair of longitudinally spaced apertures are provided in wall 61 respectively spaced from the top edge of wall 61 and a second pair of longitudinally spaced apertures are respectively spaced a short distance below the first row of apertures and bolts 61*a*–61*d* pass through these apertures and connect one end of bracket 60 to wall 21. Similarly, bolts 61*e*–61*h* connect the other end of bracket 60 to wall 21. Accordingly, mounting bracket 60 will rigidly maintain dome 10 within the machinery compartment of the refrigerator and provide a counterbalancing force to offset any unbalanced forces which dome 10 presents.

Figure 17:
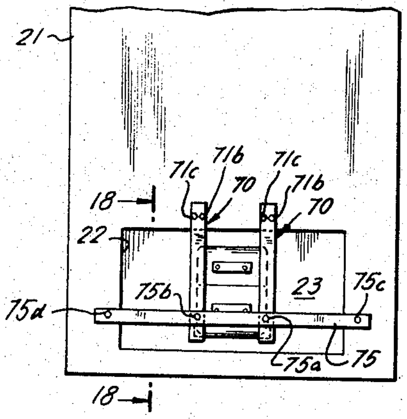
FIG. 17 is an illustration of a dome mounted on the rear wall of the refrigerator by a sixth arrangement of mounting brackets.
Figure 17A:
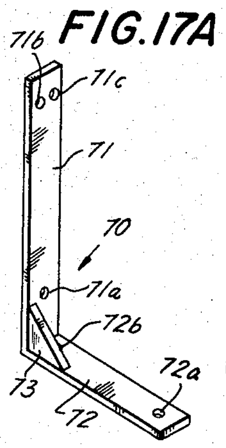
Figure 18:
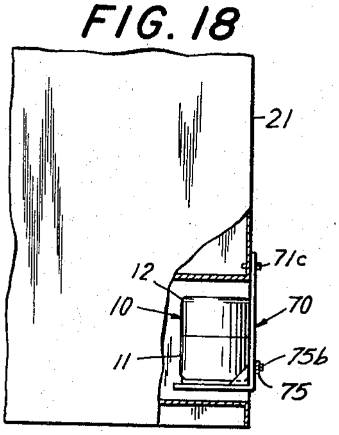
FIG. 18 is a partial sectional view taken along lines 18—18 of FIG. 17.

A sixth embodiment of the mounting means of the present invention is illustrated in FIGS. 17, 17A and 18 and include an L-shaped bracket 70 having an upstanding member 71 and an integral horizontally extending member 72 connected to the bottom edge of member 71. A strut 73 is provided between members 71 and 72 to add an overall structural rigidity to L-shaped bracket 70. Member 71 is provided with an aperture 71*a* which is spaced from the bottom edge of member 71. Additionally, longitudinally spaced apertures 71*b* and 71*c* are respectively provided adjacent the upper edge of member 71. Member 72 is provided with laterally spaced apertures 72*a* and 72*b* which are adapted to be aligned with the laterally spaced apertures in base 14 of dome 10 (i.e. apertures 14*a*, 14*b* or 14*c*, 14*d*).

When it is desired to mount dome 10 within the machinery compartment 23 of the refrigerator, each of the brackets 70 is connected to the base 14 of the dome by passing bolts through apertures 72*a* and 72*b* in member 72 and through respective laterally spaced apertures 14*a*, 14*b* on one side of dome 10 and apertures 14*c* and 14*d* on the other side of dome 10. Thus, members 72 will be bolted to the under side of base 14 of dome 10 with members 71 projecting vertically upward therefrom. Appropriate holes may be drilled in rear wall 21 of the refrigerator which are respectively aligned with apertures 71*c* and 71*b* on each of the brackets 70 so bolts may be passed through the apertures in wall 21 and in member 71 to secure dome 10 in place. A mounting strap 75 is further provided to counteract the forces set up because of the off-center mounting of dome 10 to rear wall 21. Thus, strap 75, whose width is greater than the width of opening 72, is provided with longitudinally spaced apertures 75*a* and 75*b* which are respectively positioned to be aligned with the apertures 71*a* in each of the brackets 70. Accordingly, strap 75 is connected to the L-shaped mounting brackets 70 by bolts passing through the respective apertures 75*a* and 75*b* and the respective apertures 71*a* in each of the brackets 70 and is affixed thereto by a nut. Moreover, apertures 75*c* and 75*d*, which are respectively located adjacent the free ends of the strap 75, are positioned to overlie wall 21. Holes may be drilled in the rear wall 21 of the refrigerator in alignment with the respective apertures 75*a* and 75*b* to receive bolts passing therethrough to rigidly connect strap 75 to the rear wall of the refrigerator to add further support to the mounting arrangement.

Figure 19:
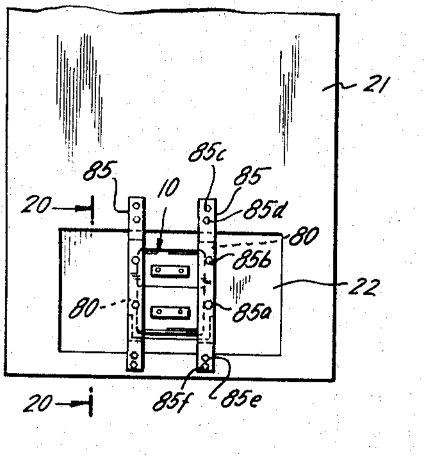
FIG. 19 is an illustration of a dome mounted within a refrigerator machinery compartment by a seventh embodiment of mounting brackets.
Figure 20:
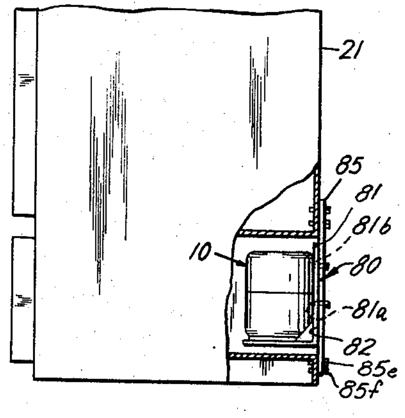
FIG. 20 is a partial sectional view taken along lines 20—20 of FIG. 19.

A seventh embodiment of the mounting means of the present invention is illustrated in FIGS. 19 and 20 and comprises a pair of L-shaped mounting brackets 80. Each of the brackets 80 include a rear vertical member 81 which is substantially equal in height to the height of dome 10 and a horizontally extending base member 82 which is provided with apertures which are positioned to be aligned with the laterally spaced apertures 14*a*, 14*b* or 14*c*, 14*d* on base 14 of dome 10, similar to the apertures in member 72 of bracket 70. Member 81 of bracket 80 is provided with transversely spaced apertures 81*a* and 81*b*. Brackets 80 are rigidly affixed to dome 10 in the manner noted above in conjunction with the connection of brackets 70 to dome 10. Additionally, straps 85 are affixed to brackets 80 and connect these brackets to the refrigerator. Thus, the height of straps 85 is substantially greater than the height of opening 22 in rear wall 21 of the refrigerator. Moreover, straps 85 are provided with transversely spaced apertures which are respectively positioned to be aligned with apertures 81*a* and 81*b* in bracket 80. Strap 85 is rigidly connected to bracket 80 by bolts 85*a*, 85*b* passing through the respective aligned apertures. Additionally, straps 85 are provided with transversely spaced apertures spaced from one free end of strap 85 and transversely spaced apertures respectively spaced from the other free end of straps 85. Thus, appropriate holes may be drilled in rear wall 21 of the refrigerator which are respectively aligned with these apertures so bolts 85*c*–85*f* passing through the respective apertures adjacent the free ends of straps 85 and rear wall 21 will rigidly secure bands 85 to the refrigerator to thereby mount dome 10 in place and provide counterbalancing forces for the torque generated by dome 20 due to its off-center mounting with respect to rear wall 21.

While preferred embodiments of the present invention have been described and illustrated herein, it will become apparent to those skilled in the art that modifications may be made therein without departing from the spirit or scope of the present invention. For example, apertures 15*a*, 15*b* and 16*a*, 16*b* and the respective support brackets 15 and 16 need not be threaded since the bolts may pass therethrough and have nuts threaded on the ends to secure the bolts in place. Moreover, where a number of transversely spaced apertures are provided in the free end of the mounting brackets, such as bracket 31 in FIG. 6, it is not necessary that all the apertures overlie the rear wall of the refrigerator but some may be located below wall 21 and the remaining apertures may be utilized for mounting the mounting bracket on the rear wall. That is, apertures 31*e* may be located below rear wall 21 in which case apertures 31*d* and 31*c* will receive the bolts therethrough to mount the dome 10 on the rear wall 21 of the refrigerator.

What is claimed is:

1. Mounting means for a cylindrical motor-compressor unit having a housing completely enclosing the motor-compressor unit for a refrigerator cabinet of the type having a machinery compartment, said unit having a predetermined center of gravity, said mounting means comprising:

(1) first means comprising a plurality of elongated support brackets, means for connecting each of said support brackets to said housing intermediate their ends, each of said support brackets having portions lying in a plane tangent to a point on said housing whereby the ends of each of said plurality of support brackets are spaced from said housing, and at least one aperture adjacent each free end of each of said plurality of support brackets; and (2) second means comprising a substantially L-shaped bracket having a vertical wall and a horizontally extending base wall connected to said vertical wall and adapted to support said unit thereon, a first plurality of apertures in said vertical wall positioned to be in alignment with the apertures in one of said plurality of support brackets, at least one free end of said vertical wall adapted to overlie and abut the rear wall of the refrigerator cabinet, and a second plurality of apertures in said free end adapted to receive bolts therethrough to connect said L-shaped bracket to the rear wall of the refrigerator cabinet.

2. Mounting means for mounting a motor-compressor unit as defined in claim 1, said second means further including a mounting strap having a width larger than the width of the refrigerator, so the free ends thereof overlie the rear wall of the refrigerator, a plurality of apertures in said mounting strap intermediate the ends thereof, each of said apertures being positioned to be aligned with a respective one of said first plurality of apertures in said vertical wall whereby bolts passing through each of said aligned apertures connects said mounting strap to said unit, and means adapted to connect the free ends of said mounting strap to the rear wall of the refrigerator.

3. Mounting means for a cylindrical motor-compressor unit having a housing completely enclosing the motor-compressor unit for a refrigerator cabinet of the type having a machinery compartment, said unit having a predetermined center of gravity, said mounting means comprising:

(1) first means comprising a base plate having portions extending beyond the periphery of said housing and a plurality of apertures in said portions of said base plate;

(2) second means comprising a vertical wall having a height such that the ends of the vertical wall are adapted to overlie the rear wall of the refrigerator cabinet, and a horizontal shelf connected to said vertical wall for supporting said unit thereon, a plurality of apertures in said shelf, each of said apertures in said shelf positioned and adapted to be aligned with a respective aperture in said base plate so bolts passing through each of said aligned apertures will rigidly connect said unit to said shelf, and means for connecting the end of said vertical wall to the refrigerator cabinet.

4. Mounting means for a cylindrical motor-compressor unit having a housing completely enclosing the motor-compressor unit for a refrigerator cabinet of the type having a machinery compartment, said unit having a predetermined center of gravity, said mounting means comprising:

(1) first means comprising a base plate having portions extending beyond the periphery of said housing and a plurality of apertures in said portions of said base plate; and (2) second means comprising a plurality of L-shaped mounting brackets, each of said plurality of L-shaped brackets comprising an upstanding member and a horizontal member connected to the lower edge of said upstanding member, the horizontal members of each of said plurality of L-shaped brackets being provided with a plurality of apertures, each of said plurality of apertures in each of said horizontal members being positioned to be aligned with different respective apertures in said base plate whereby bolts passing through said aligned apertures rigidly connect said unit to said L-shaped brackets, and means adapted to connect said upstanding members to the rear wall of the refrigerator cabinet.

5. A refrigerator cabinet including a machinery compartment and a rear wall having an opening therein for providing access to said machinery compartment, a cylindrical dome in said machinery compartment having a predetermined center of gravity, and mounting means for mounting the dome upright in said machinery compartment; said mounting means including first means connected to said dome and having a portion respectively spaced from the dome and the center of gravity, said first means comprising:

a plurality of elongated support brackets, means connecting each of said support brackets to said housing intermediate their free ends, each of said support brackets having portions lying in a plane tangent to a point on said dome whereby the ends of each of said plurality of support brackets are spaced from said dome, and second means comprising a substantially L-shaped bracket having a vertical wall and a horizontally extending base wall, said dome being mounted on said base wall, means connecting said vertical wall to said rear wall, a mounting strap having a dimension larger than a dimension of said opening whereby the ends of said strap overlies the rear wall of the refrigerator, means for connecting the strap to said L-shaped bracket and at least one of said support brackets, and means for connecting the ends of said strap to said rear wall.

6. A refrigerator cabinet including a machinery compartment and a rear wall having an opening therein for providing access to said machinery compartment, a cylindrical dome in said machinery compartment having a predetermined center of gravity, and mounting means for mounting the dome upright in said machinery compartment; said mounting means including first means connected to said dome and having a portion respectively spaced from the dome and the center of gravity, said first means comprising:

a base plate having portions extending beyond the periphery of said housing, whereby said portions are adapted to be connected to a second means, said second means comprising a vertical plate having a height substantially in excess of the opening in the rear wall of the refrigerator so the ends of said plate overlie portions of the rear wall of the refrigerator, and a horizontal shelf connected to said vertical plate and extending into said machinery compartment and receiving the dome thereon, means connecting said portions of said base to said shelf, and means connecting the ends of said plate to said rear wall.

7. Mounting means for a cylindrical motor-compressor unit having a housing completely enclosing the motor-compressor unit for a refrigerator cabinet of the type having a rear wall and a machinery compartment, said unit having a predetermined center of gravity, said mounting means comprising:

(1) first means comprising a plurality of elongated support brackets, means for connecting each of said support brackets to said housing intermediate their ends, each of said support brackets having portions lying in a plane tangent at a point to said housing whereby the ends of each of said plurality of support brackets are spaced from said housing, and at least one aperture adjacent each free end of each of said plurality of support brackets; and (2) second means comprising a plurality of mounting straps, a first plurality of apertures in each of said mounting straps spaced from each other by a distance equal to the spacing between the apertures in each of said plurality of support brackets and adapted to be aligned therewith whereby bolts passing through said aligned apertures rigidly connect said support brackets and straps, each of said plurality of mounting straps being sized and positioned so at least one free end of each of said straps overlies the rear wall of the refrigerator cabinet when said unit is received within the machinery compartment, and at least one of said straps has a second free end which also overlies said rear wall and means for connecting said free ends of said plurality of mounting straps to the refrigerator cabinet rear wall.

8. A refrigerator cabinet including a machinery compartment and a rear wall having an opening therein for providing access to said machinery compartment, a cylindrical dome in said machinery compartment having a predetermined center of gravity, and mounting means for mounting the dome upright in said machinery compartment; said mounting means including first means connected to said dome and having a portion respectively spaced from the dome and the center of gravity, said first means comprising:

a plurality of elongated support brackets, means connecting each of said support brackets to said housing intermediate their free ends, each of said support brackets having portions lying in a plane tangent to a point on said dome whereby the ends of each of said plurality of support brackets are spaced from said dome; and second means comprises a plurality of mounting straps having portions overlying said rear wall, means connecting said straps to the ends of said support brackets, and means connecting the portions of said straps overlying the rear wall to said rear wall.

References Cited

UNITED STATES PATENTS

| | | | |
|---|---|---|---|
| 1,653,237 | 12/1927 | Spreen | 248—16 |
| 1,653,238 | 12/1927 | Spreen | 248—16 |
| 1,653,239 | 12/1927 | Spreen | 248—16 |
| 2,250,142 | 7/1941 | Umstead | 248—16 |
| 2,406,587 | 8/1946 | Cooper | 220—3.9 |
| 2,472,752 | 6/1949 | Mackereth | 248—14 |
| 2,878,955 | 3/1959 | Hagan | 220—3.9 |

ROY D. FRAZIER, *Primary Examiner.*

JOHN PETO, *Examiner.*

UNITED STATES PATENT OFFICE
CERTIFICATE OF CORRECTION

Patent No. 3,339,868 September 5, 1967

Henry Ehrens et al.

It is hereby certified that error appears in the above numbered patent requiring correction and that the said Letters Patent should read as corrected below.

Column 6, line 47, for "72" read -- 22 --; column 7, line 71, for "refrigerator" read -- compartment --; column 10, line 27, for "comprises" read -- comprising --.

Signed and sealed this 26th day of November 1968.

(SEAL)
Attest:

Edward M. Fletcher, Jr.
Attesting Officer

EDWARD J. BRENNER
Commissioner of Patents